United States Patent
Ohashi et al.

(10) Patent No.: US 9,479,657 B2
(45) Date of Patent: Oct. 25, 2016

(54) IMAGE PROCESSING APPARATUS AND METHOD FOR THE SAME

(71) Applicant: BROTHER KOGYO KABUSHIKI KAISHA, Nagoya, Aichi (JP)

(72) Inventors: Tsuyoshi Ohashi, Hashima (JP); Kazuhito Misumi, Konan (JP); Wataru Fujishiro, Anjo (JP); Etsuteru Inoue, Obu (JP); Nobumasa Tanaka, Aichi (JP); Takuya Nagai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/868,875

(22) Filed: Sep. 29, 2015

(65) Prior Publication Data

US 2016/0094734 A1    Mar. 31, 2016

(30) Foreign Application Priority Data

Sep. 30, 2014   (JP) ................. 2014-202526

(51) Int. Cl.
| | |
|---|---|
| H04N 1/00 | (2006.01) |
| G06F 3/12 | (2006.01) |
| H04W 76/02 | (2009.01) |
| H04W 4/00 | (2009.01) |
| H04B 5/00 | (2006.01) |

(52) U.S. Cl.
CPC ........ *H04N 1/00307* (2013.01); *G06F 3/1236* (2013.01); *G06F 3/1292* (2013.01); *H04B 5/0031* (2013.01); *H04W 4/008* (2013.01); *H04W 76/023* (2013.01); *H04B 5/00* (2013.01); *H04N 2201/0094* (2013.01)

(58) Field of Classification Search
USPC ........................................ 358/1.15
See application file for complete search history.

(56) References Cited

U.S. PATENT DOCUMENTS

| | | | | |
|---|---|---|---|---|
| 5,101,283 A | * | 3/1992 | Seki ................. | H04N 1/00411 358/3.03 |
| 2005/0125682 A1 | | 6/2005 | Eguchi | |
| 2008/0007767 A1 | | 1/2008 | Ishimaru | |

(Continued)

FOREIGN PATENT DOCUMENTS

| | | |
|---|---|---|
| JP | 2005-167739 A | 6/2005 |
| JP | 2008-17381 A | 1/2008 |

(Continued)

*Primary Examiner* — Jerome Grant, II
(74) *Attorney, Agent, or Firm* — Scully, Scott, Murphy & Presser, PC

(57) ABSTRACT

An image processing apparatus including a wireless communication unit, an image processing unit, and a controller configured to establish a wireless connection to perform wireless signal communication between the wireless communication unit and an external device, acquire a reception intensity of a wireless signal received from the external device via the wireless communication unit, determine whether the reception intensity is more than a threshold value, when determining that the reception intensity is more than the threshold value, control the image processing unit to execute an image processing instruction received from the external device via the wireless communication unit, and when determining that the reception intensity is not more than the threshold value, transmit an instruction to display a warning on the external device, to the external device via the wireless communication unit, without controlling the image processing unit to execute the image processing instruction.

14 Claims, 6 Drawing Sheets

(56) References Cited

U.S. PATENT DOCUMENTS

| | | | | |
|---|---|---|---|---|
| 2009/0254843 | A1* | 10/2009 | Van Wie | H04L 12/1822 715/757 |
| 2011/0207509 | A1* | 8/2011 | Crawford | H04W 52/0258 455/574 |
| 2011/0213225 | A1* | 9/2011 | Bernstein | G06Q 50/22 600/309 |
| 2012/0014257 | A1* | 1/2012 | Ahluwalia | H04W 48/12 370/241 |
| 2012/0069380 | A1 | 3/2012 | Sugimoto | |
| 2012/0176898 | A1* | 7/2012 | Ehsan | H04L 47/14 370/232 |
| 2012/0230308 | A1* | 9/2012 | Saito | H04W 48/16 370/338 |
| 2013/0102279 | A1* | 4/2013 | Lee | H04M 1/67 455/410 |
| 2013/0222840 | A1 | 8/2013 | Hosoda | |
| 2014/0092805 | A1* | 4/2014 | van de Ven | H04W 76/02 370/328 |
| 2015/0085682 | A1* | 3/2015 | Hasegawa | H04M 1/7253 370/252 |
| 2015/0347070 | A1* | 12/2015 | Ha | H04N 1/00411 358/1.15 |
| 2016/0033254 | A1* | 2/2016 | Zeine | H02J 5/005 307/104 |
| 2016/0134930 | A1* | 5/2016 | Swafford | H04N 21/43637 725/80 |
| 2016/0173226 | A1* | 6/2016 | Choi | H04W 28/0252 455/1 |
| 2016/0183317 | A1* | 6/2016 | Shao | H04W 76/023 709/227 |

FOREIGN PATENT DOCUMENTS

| | | |
|---|---|---|
| JP | 2011-65369 A | 3/2011 |
| JP | 2012-70068 A | 4/2012 |
| JP | 2013-153281 A | 8/2013 |
| JP | 2013-158061 A | 8/2013 |
| JP | 2013-183215 A | 9/2013 |

* cited by examiner

IMAGE PROCESSING APPARATUS AND METHOD FOR THE SAME

CROSS-REFERENCE TO RELATED APPLICATION

This application claims priority under 35 U.S.C. §119 from Japanese Patent Application No. 2014-202526 filed on Sep. 30, 2014. The entire subject matter of the application is incorporated herein by reference.

BACKGROUND

1. Technical Field

The following description relates to one or more techniques for an image processing apparatus.

2. Related Art

An image forming apparatus has been known that is configured to be remotely controlled via wireless communication by an external terminal device. According to the known image forming apparatus, when a user attempts to log in to the image forming apparatus from the external terminal device, and the login request is permitted by the image forming apparatus, the user is allowed to use the image forming apparatus via the external terminal device.

SUMMARY

In the meantime, there is a demand to establish a wireless connection with an image processing apparatus such as a multi-function peripheral from one or more external terminal devices used by many and unspecified users, without performing a troublesome authentication process such as a login process.

For instance, there may be a case where users wish to use an image processing apparatus, which is installed in a booth for an exhibition, from one or more external terminal devices inside the booth. In such a case, the users may wish to use the image processing apparatus from the one or more external terminal devices inside the booth without performing any authentication process.

However, the image processing apparatus might be used via wireless communication from an external terminal device outside the booth in which there is no need to perform any authentication process. Further, when the image processing apparatus is configured to be available through an authentication process to ensure a high level of security, it might cause the following inconvenience. That is, in such a case, even though it is assured that an external terminal device is inside the booth, the authentication process via wireless communication is required to use the image processing apparatus from the external terminal device.

Aspects of the present disclosure are advantageous to provide one or more improved techniques, for an image processing apparatus, which make it possible to establish a connection with external terminal devices without any authentication process, and to execute an image processing instruction from an external terminal device inside a predetermined area but not execute an image processing instruction from an external terminal device outside the predetermined area.

According to aspects of the present disclosure, an image processing apparatus is provided, which includes a wireless communication unit, an image processing unit, and a controller configured to, when the wireless communication unit receives a wireless signal from an external device, begin a connection operation to establish a wireless connection and perform wireless signal communication between the wireless communication unit and the external device, acquire a reception intensity of the wireless signal received from the external device via the wireless communication unit, determine whether the acquired reception intensity is more than a first threshold value, when determining that the acquired reception intensity is more than the first threshold value, control the image processing unit to execute an image processing instruction received from the external device via the wireless communication unit, and when determining that the acquired reception intensity is not more than the first threshold value, transmit a warning display instruction to display a warning on the external device, to the external device via the wireless communication unit, without controlling the image processing unit to execute the image processing instruction.

According to aspects of the present disclosure, further provided is a method adapted to be implemented on a processor coupled with an image processing apparatus including a wireless communication unit and an image processing unit, the method including beginning, when the wireless communication unit receives a wireless signal from an external device, a connection operation to establish a wireless connection and perform wireless signal communication between the wireless communication unit and an external device, acquiring a reception intensity of a wireless signal received from the external device via the wireless communication unit, determining whether the acquired reception intensity is more than a first threshold value, when determining that the acquired reception intensity is more than the first threshold value, controlling the image processing unit to execute an image processing instruction received from the external device via the wireless communication unit, and when determining that the acquired reception intensity is not more than the first threshold value, transmitting a warning display instruction to display a warning on the external device, to the external device via the wireless communication unit, without controlling the image processing unit to execute the image processing instruction.

BRIEF DESCRIPTION OF THE ACCOMPANYING DRAWINGS

FIG. 1 schematically shows a configuration of an image processing system in an illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

<System Configuration>

Figure 1:
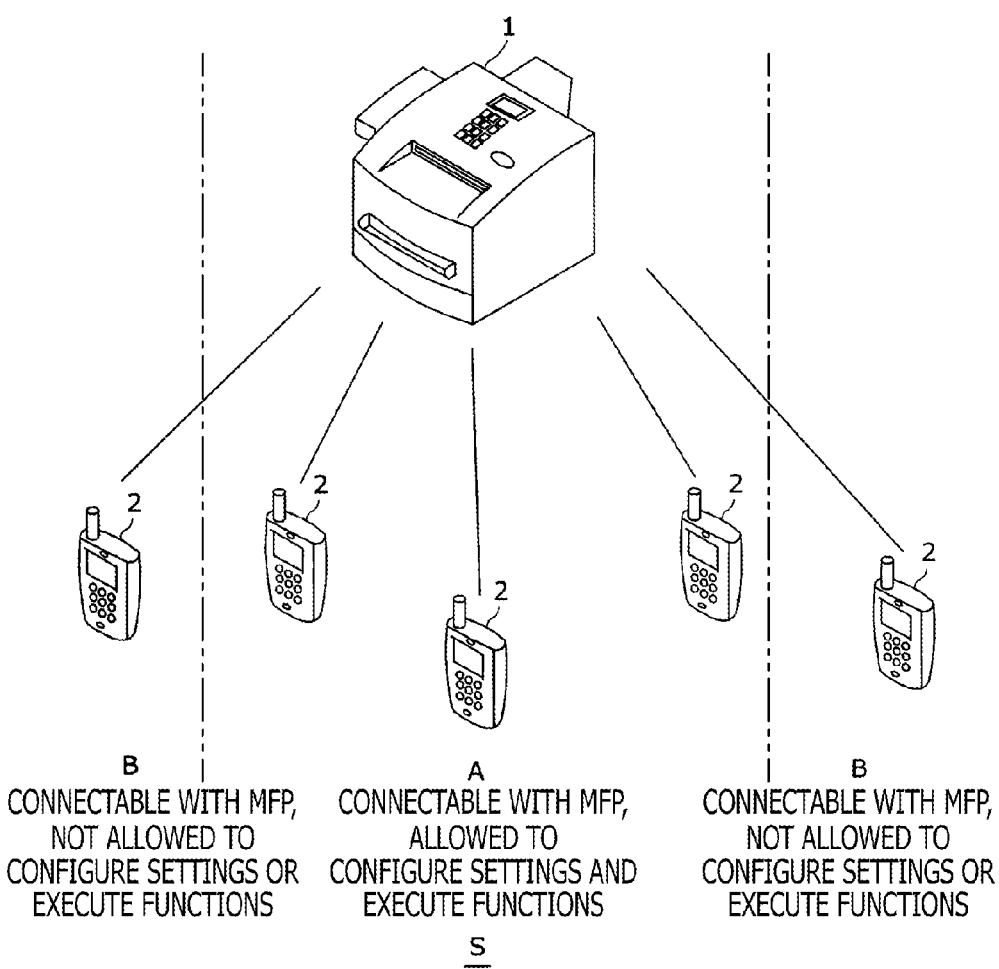

As shown in FIG. 1, an image processing system S includes an MFP (which is an abbreviated form of "Multi-Function Peripheral") 1, and external terminal devices 2 such as mobile telephones and smartphones. Each of the MFP 1 and the external terminal devices 2 has a wireless communication function based on Wi-Fi Direct (Wi-Fi Direct® is a trademark registered by Wi-Fi Alliance) that is one of wireless LAN standards. By the wireless communication function, it is possible to achieve peer-to-peer wireless communication between the MFP 1 and the external terminal devices 2.

The MFP 1 is installed inside a predetermined area A. The external terminal devices 2 are allowed to connect with the MFP 1 via wireless communication from the predetermined area A and an area B adjacent to the area A. The area A is an area (e.g., an area inside a booth defined for exhibition and an area within a particular house) in which it is desired for users inside the area A to use the MFP 1 installed inside the predetermined area A. The area B is a conceptual area (e.g., an area outside a booth defined for exhibition and an area outside a particular house in which the users live) outside the area A.

Figure 2:
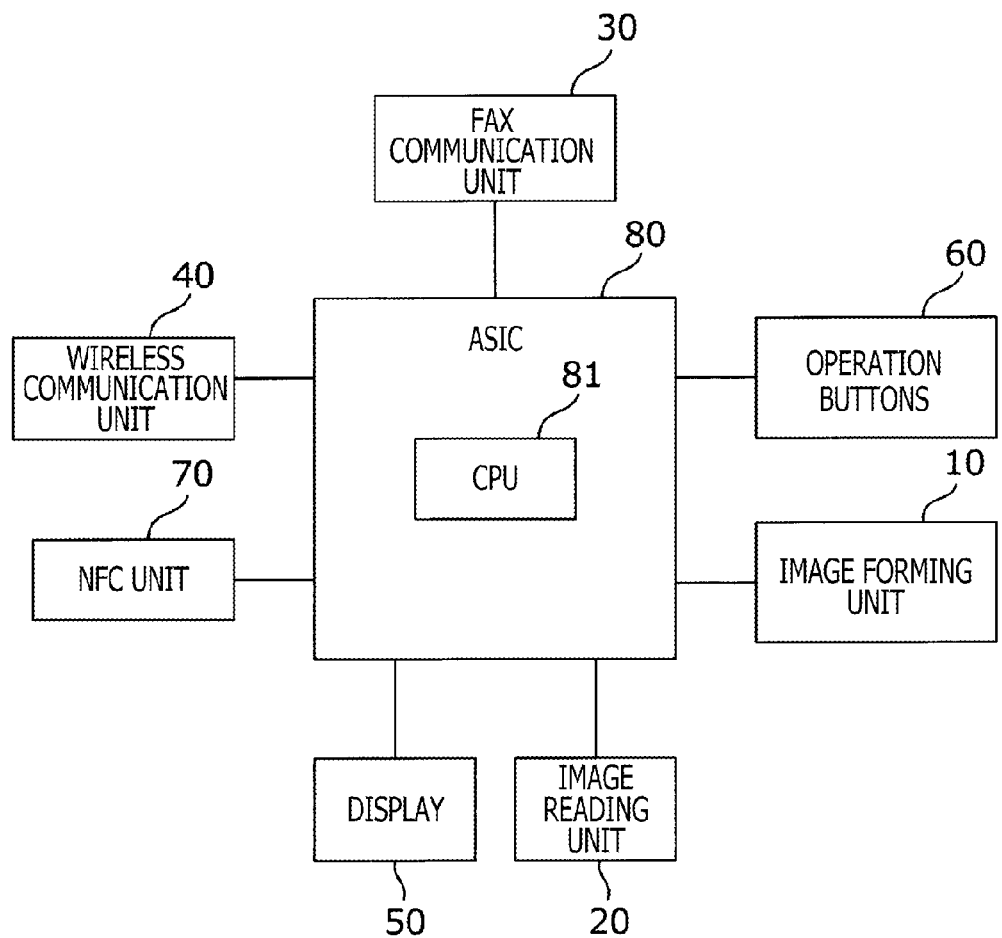
FIG. 2 is a block diagram schematically showing a configuration of an MFP (which is an abbreviated form of "multi-function peripheral") included in the image processing system in the illustrative embodiment according to one or more aspects of the present disclosure.

As shown in FIG. 2, the MFP 1 includes an image forming unit 10, an image reading unit 20, a facsimile communication unit (hereinafter referred to as a "FAX communication unit") 30, a wireless communication unit 40, a display 50, operation buttons 60, a near-field wireless communication unit 70 (hereinafter referred to as an "NFC unit") 70, and an ASIC (which is an abbreviated form of "Application Specific Integrated Circuit") 80.

The image forming unit 10 is configured to perform printing (e.g., color printing and monochrome printing) based on image data and form an image on a sheet in an image forming method such as an electrophotographic method or an inkjet method.

The image reading unit 20 is configured to read an image formed on a sheet and generate image data of the read image. The image reading unit 20 is further configured to store the generated image data into a RAM (not shown).

The FAX communication unit 30 is configured to perform facsimile communication using a public telephone network.

The wireless communication unit 40 is configured to perform wireless communication by transmitting and receiving wireless signals. Further, the wireless communication unit 40 is configured to detect intensities of externally-received wireless signals.

For instance, the display 50 includes a liquid crystal display device. The display 50 is configured to display various kinds of information such as various setting screens and operational states of the MFP 1.

The operation buttons 60 include a plurality of operable members such as a start button, numeric keypad, and cursors. By user operations of the operation buttons 60, it is possible to input various instructions.

The NFC unit 70 is configured to perform bidirectional short-distance wireless communication with a non-contact IC card such as an ID card.

The ASIC 80 includes a CPU 81 embedded therein. The ASIC 80 is configured to perform data communication with the external terminal devices 2 via the wireless communication unit 40. The CPU 81 is configured to control the image forming unit 10 and the image reading unit 20 and control communication via the FAX communication unit 30, the wireless communication unit 40, and the NFC unit 70, by executing programs for various operations based on information input into the ASIC 80.

<Function Permission Process>

Figure 3A:
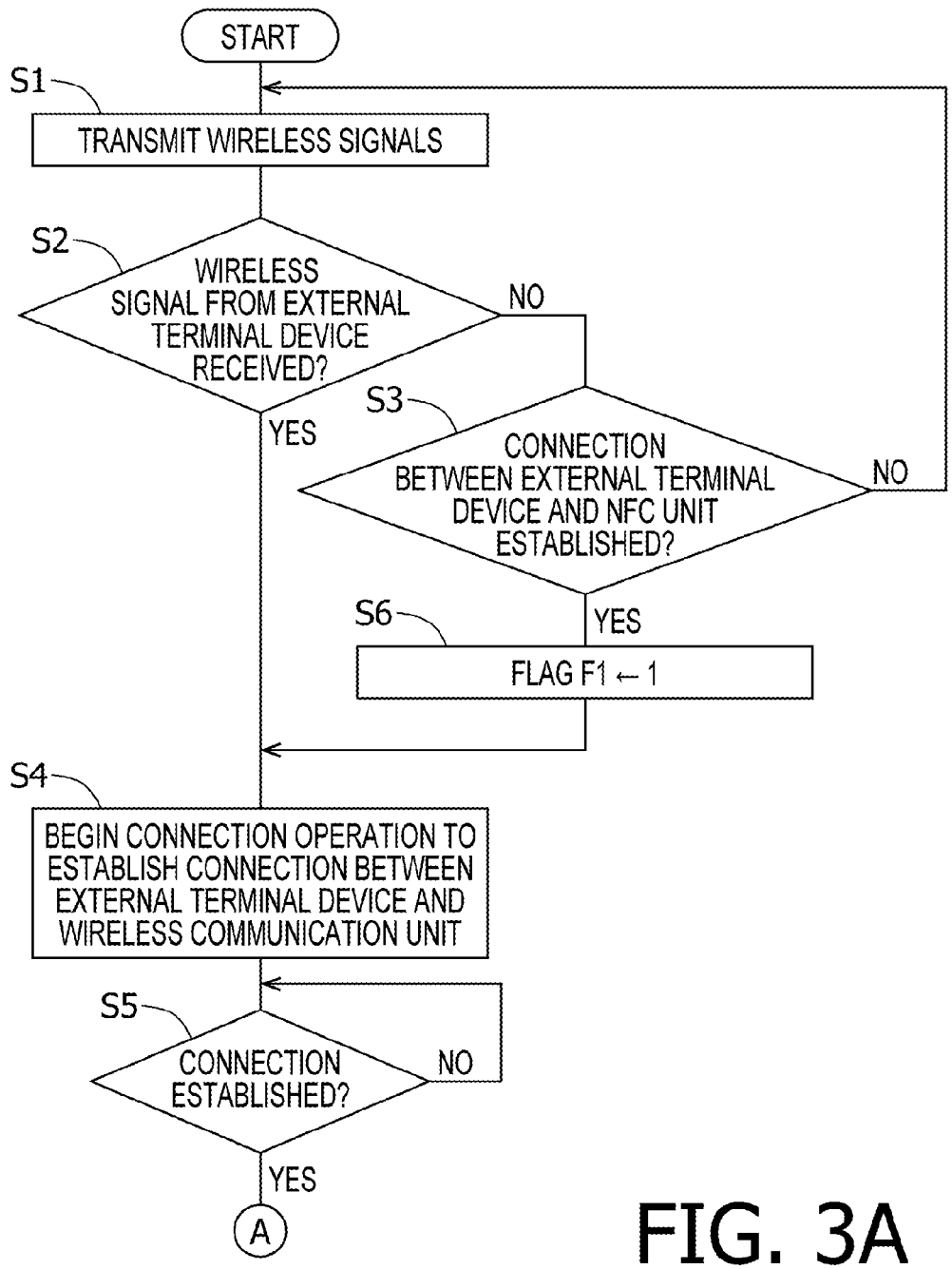
FIGS. 3A and 3B are flowcharts showing a procedure of a function permission process to be executed by the MFP in the illustrative embodiment according to one or more aspects of the present disclosure.
Figure 3B:
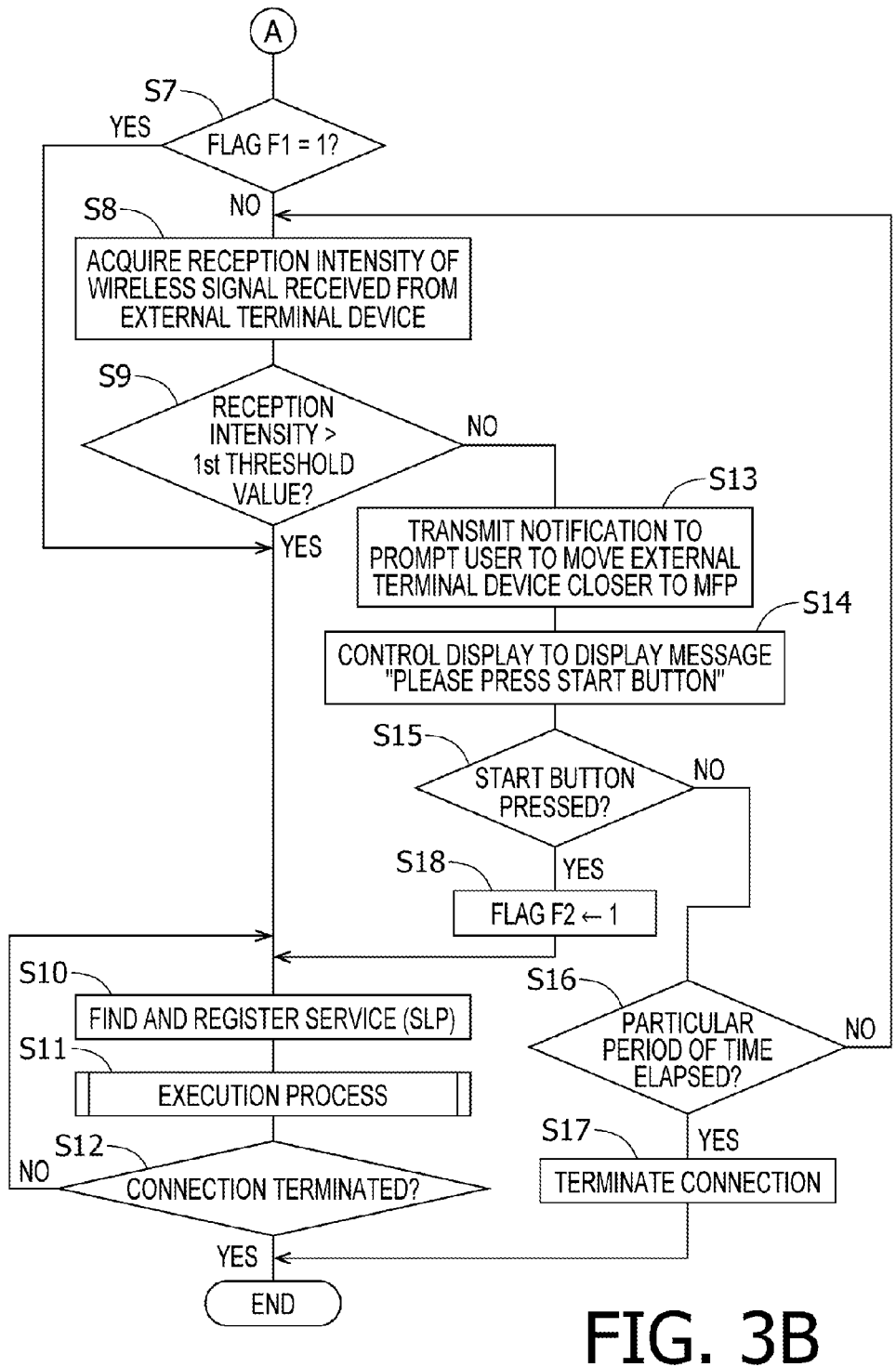

While the MFP 1 is powered on, the CPU 81 of the ASIC 80 repeatedly performs a function permission process shown in FIGS. 3A and 3B.

In the function permission process, the CPU 81 transmits wireless signals for starting wireless communication with external terminal devices 2, via wireless communication (S1).

When an external terminal device 2 receives a wireless signal from the MFP 1, the external terminal device 2 transmits to the MFP 1 a wireless signal for establishing a connection between the MFP 1 and the external terminal device 2. The CPU 81 determines whether the MFP 1 has received the wireless signal from the external terminal device 2 (S2). When wireless signal communication is performed via "Wi-Fi Direct" between the MFP 1 and the external terminal device 2, for instance, the wireless signal communication is performed in accordance with LLTD (which is an abbreviated form of "Link Layer Topology Discovery") protocol.

When determining that the MFP 1 has not received the wireless signal from the external terminal device 2 (S2: No), the CPU 81 determines whether a connection between the NFC unit 70 and the external terminal device 2 has been successfully established (S3).

When determining that a connection between the NFC unit 70 and the external terminal device 2 has been successfully established (S3: Yes), the CPU 81 goes to S6. In S6, the CPU 81 sets a flag F1 stored in the RAM to "1."

Then, the CPU 81 begins a connection operation to establish a connection between the wireless communication unit 40 and the external terminal device 2 which has succeeded in establishment of the connection with the NFC 70 (S4).

When determining that a connection between the NFC unit 70 and the external terminal device 2 has not been successfully established (S3: No), the CPU 81 goes back to S1. In S1, the CPU 81 searches and finds an external terminal device 2 again and performs the operations in S2 and the subsequent steps.

When determining that the MFP 1 has received the wireless signal from the external terminal device 2 (S2: Yes), the CPU 81 begins a connection operation to establish a connection between the wireless communication unit 40 and the external terminal device 2 (S4).

The CPU 81 waits until the connection between the wireless communication unit 40 and the external terminal device 2 is established (S5).

When determining that establishment of the connection between the wireless communication unit 40 and the external terminal device 2 has been established (S5: Yes), the CPU 81 determines whether the flag F1 stored in the RAM is set to "1" (S7).

When determining that the flag F1 stored in the RAM is not set to "1" (S7: No), the CPU 81 acquires a reception intensity of the wireless signal received from the external terminal device 2, from the wireless communication unit 40 (S8).

Then, the CPU 81 determines whether the acquired reception intensity is more than a first threshold value (S9). The first threshold value may be a lower limit intensity of wireless signals which the wireless communication unit 40 receives from the external terminal device 2 inside the predetermined area A where the MFP 1 is installed.

When determining that the acquired reception intensity is more than a first threshold value (S9: Yes), that is, when the external terminal device 2 exists within the area A and is sufficiently close to the MFP 1, the CPU 81 transmits to the external terminal device 2 a list of available services (e.g., image processing functions of the MFP 1) to be provided by the MFP 1. Specifically, for instance, the CPU 81 transmits, to the external terminal device 2, information indicating that the available services are a print service and a FAX transmission service.

Further, when determining that the flag F1 stored in the RAM is set to "1" (S7: Yes), that is, when the external terminal device 2 has been connected with the wireless communication unit 40 after establishment of the connection with the NFC unit 70, the CPU 81 transmits to the external terminal device 2 the list of the available services to be provided by the MFP 1.

The external terminal device 2, which has received the list of the available services to be provided by the MFP 1, transmits to the MFP 1 information indicating the kind of a service requested by the external terminal device 2, e.g., information indicating that a service requested by the external terminal device 2 is the print service. Thereby, the CPU 81 receives the kind of the service from the external terminal device 2. The CPU 81 registers the kind of the service received from the external terminal device 2 (S10). Here, it is assumed that the received kind of the service is the FAX transmission service or the print service. Finding the service is performed, e.g., in accordance with SLP (which is an abbreviated form of "Service Location Protocol").

Thereafter, the CPU 81 performs an execution process (S11). The execution process is a process to cause the MFP 1 to execute an image processing function. The execution process will be described in detail later.

After completion of the execution process, the CPU 81 determines whether the connection between the wireless communication unit 40 and the external terminal device 2 is terminated (S12).

When determining that the connection between the wireless communication unit 40 and the external terminal device 2 is not terminated (S12: No), the CPU 81 again performs the aforementioned operations in S10 and the subsequent steps and executes operations responsive to a new request for a service from the external terminal device 2.

When determining that the connection between the wireless communication unit 40 and the external terminal device 2 is terminated (S12: Yes), the CPU 81 terminates the function permission process.

Meanwhile, when determining that the acquired reception intensity is not more than the first threshold value (S9: No), the CPU 81 transmits to the external terminal device 2 a warning notification to cause the external terminal device 2 to display a warning (S13). Specifically, for instance, the warning may be information that prompts the user of the external terminal device 2 to move the external terminal device 2 closer to the MFP 1.

Then, the CPU 81 controls the display 50 to display a message "Please press the start button" (S14). Thereby, it is possible to prompt the user to press the start button of the operation buttons 60.

The CPU 81 determines whether an operation of pressing the start button has been accepted via the operation buttons 60 (S15).

When determining that the operation of pressing the start button has not been accepted (S15: No), the CPU 81 determines whether a particular period of time has elapsed since the transmission of the warning notification to the external terminal device 2 (S16).

When determining that the particular period of time has not elapsed since the transmission of the warning notification to the external terminal device 2 (S16: No), the CPU 81 again acquires the reception intensity of the wireless signal received from the external terminal device 2, from the wireless communication unit 40 (S8).

Then, the CPU 81 determines whether the reception intensity is more than the first threshold value (S9).

When determining that the reception intensity is not more than the first threshold value (S9: No), the CPU 81 repeatedly performs the aforementioned operations in S13 to S16 until the operation of pressing the start button is accepted (S15: Yes) or until the particular period of time elapses (S16: Yes). At this time, when the warning notification to cause the external terminal device 2 to display the warning has been already transmitted to the external terminal device 2, the CPU 81 skips the step S13. It is noted that as described above, the warning may be, for instance, information that prompts the user of the external terminal device 2 to move the external terminal device 2 to be closer to the MFP 1. Further, when the message "Please press the start button" is already displayed on the display 50, the CPU 81 skips the step S14.

When determining that the particular period of time has elapsed since the transmission of the warning notification to the external terminal device 2 (S16: Yes), the CPU 81 terminates the connection with the external terminal device 2 based on determination that the external terminal device 2 is within the area B adjacent to the area A (S17). Thereafter, the CPU 81 terminates the function permission process.

When determining that an operation of pressing the start button has been accepted (S15: Yes), the CPU 81 sets a flag F2 stored in the RAM to "1" (S18).

Then, the CPU 81 performs the operations in S10 and the subsequent steps and executes operations responsive to a new request for a service from the external terminal device 2.

Figure 4:
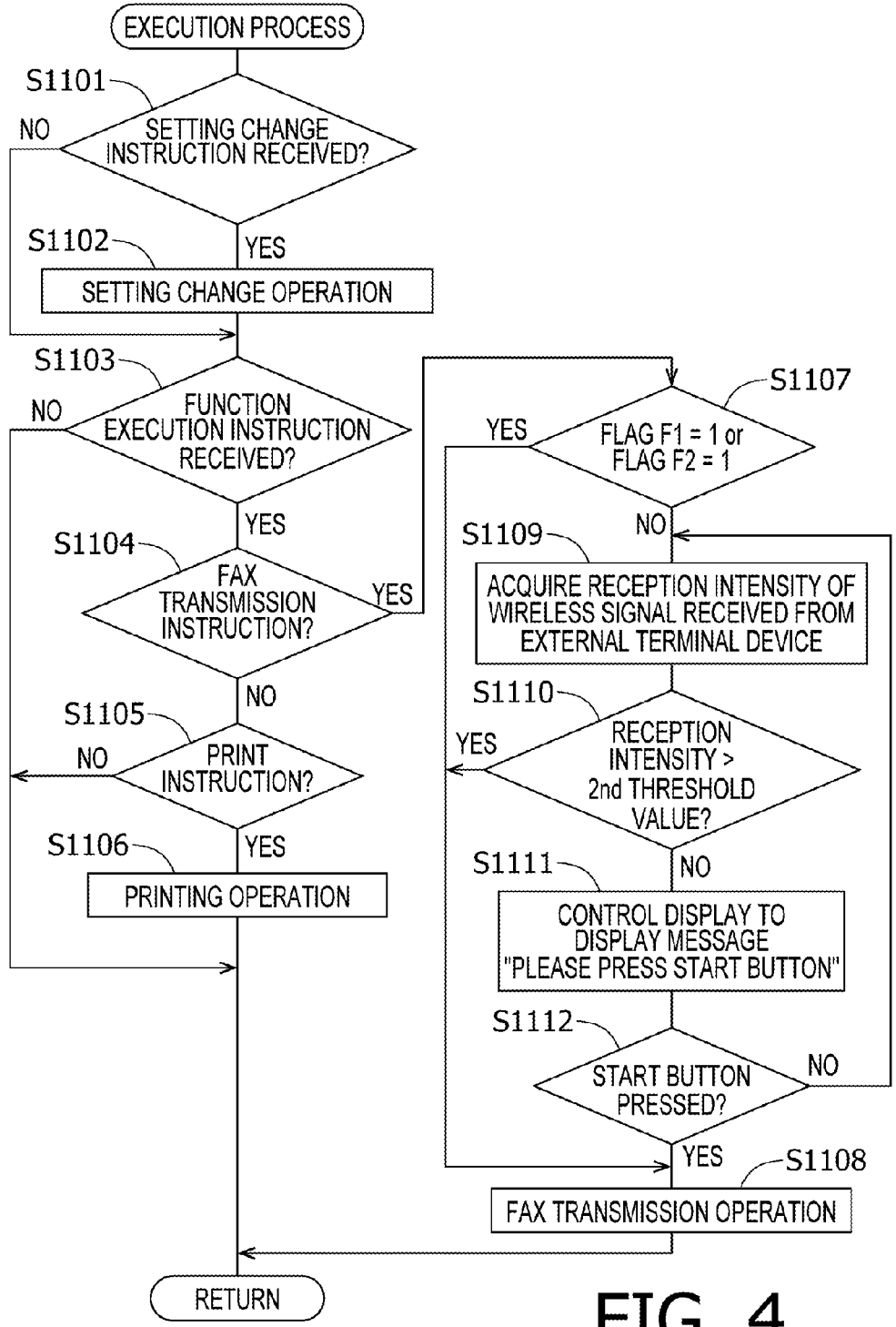
FIG. 4 is a flowchart showing a procedure of an execution process to be performed in the function permission process in the illustrative embodiment according to one or more aspects of the present disclosure.

<Execution Process>FIG. 4 is a flowchart showing a procedure of the execution process to be performed in S11 shown in FIG. 3B.

In the execution process, the CPU 81 determines whether the CPU 81 has received from the external terminal device 2 a setting change instruction to change a setting for the MFP 1 (S1101). As an example of the setting for the MFP 1, a setting for an IP address of the MFP 1 may be cited.

When determining that the CPU 81 has received from the external terminal device 2 a setting change instruction to change a setting for the MFP 1 (S1101: Yes), the CPU 81 executes a setting change operation to change the setting for the MFP 1 in accordance with the received setting change instruction (S1102). Specifically, for instance, when receiving the setting change instruction that contains an instruction to change the setting for the IP address of the MFP 1 and an IP address to be newly applied, the CPU 81 changes a current IP address for the MFP 1 to the received new IP address.

Then, the CPU 81 determines whether the CPU 81 has received a function execution instruction from the external terminal device 2 (S1103). The function execution instruction is an instruction to execute one of the image processing functions of the MFP 1. As examples of the function execution instruction, a print instruction and a FAX transmission instruction may be cited.

When determining that the CPU 81 has not received from the external terminal device 2 a setting change instruction to change a setting for the MFP 1 (S1101: No), the CPU 81 skips the step S1102 and determines whether the CPU 81 has received a function execution instruction from the external terminal device 2 (S1103).

When determining that the CPU 81 has not received a function execution instruction from the external terminal device 2 (S1103: No), the CPU 81 terminates the execution process shown in FIG. 4 and returns to the flow of the function permission process shown in FIGS. 3A and 3B.

When determining that the CPU 81 has received a function execution instruction from the external terminal device 2 (S1103: Yes), the CPU 81 determines whether the received function execution instruction is the FAX transmission instruction (S1104).

When determining that the received function execution instruction is not the FAX transmission instruction (S1104: No), the CPU 81 determines whether the received function execution instruction is the print instruction (S1105).

When determining that the received function execution instruction is the print instruction (S1105: Yes), the CPU 81 executes a printing operation of controlling the image forming unit 10 to perform printing (S1106). Thereafter, the CPU 81 terminates the execution process shown in FIG. 4 and returns to the flow of the function permission process shown in FIGS. 3A and 3B.

When determining that the received function execution instruction is not the FAX transmission instruction or the print instruction (S1105: No), the received function execution instruction is a function execution instruction to execute a function that is unavailable in the MFP 1. Therefore, without executing the operation in S1106, the CPU 81 terminates the execution process shown in FIG. 4 and returns to the flow of the function permission process shown in FIGS. 3A and 3B.

When determining that the received function execution instruction is the FAX transmission instruction (S1104: Yes), the CPU 81 determines whether one of the flags F1 and F2 stored in the RAM is set to "1" (S1107).

When determining that one of the flags F1 and F2 stored in the RAM is set to "1" (S1107: Yes), that is, when the external terminal device 2 is connected with the wireless communication unit 40 after establishment of the connection with the NFC unit 70, or the start button has been pressed in response to the message "Please press the start button" displayed on the display 50, the external terminal device 2 is close to the MFP 1, within the area A. Therefore, without imposing a further strict execution condition for FAX transmission, the CPU 81 executes a FAX transmission operation of controlling the FAX communication unit 30 to perform FAX transmission (S1108). Thereafter, the CPU 81 terminates the execution process shown in FIG. 4 and returns to the flow of the function permission process shown in FIGS. 3A and 3B.

When determining that none of the flags F1 and F2 stored in the RAM is set to "1" (S1107: No), the CPU 81 again acquires a reception intensity of the wireless signal received from the external terminal device 2, from the wireless communication unit 40 (S1109).

Then, the CPU 81 determines whether the acquired reception intensity is more than a second threshold value (S1110). The second threshold value is set higher than the first threshold value. When image data stored in the MFP 1 is transmitted via FAX transmission in response to an instruction from another external terminal device within the area B adjacent to the area A, there might be a risk that it is not possible to prevent information leakage and ensure the security. Therefore, the second threshold value, which is a reference value of the reception intensity to permit the FAX transmission operation, is set higher than the first threshold value that is y a reference value of the reception intensity to permit the printing operation. Thus, the execution condition for the FAX transmission operation is set stricter than the execution condition for the printing operation, so as to surely verify whether that the external terminal device 2 is within the area A.

When determining that the acquired reception intensity is more than the second threshold value (S1110: Yes), if the external terminal device 2 is very close to the MFP 1, within the area A, the CPU 81 executes the FAX transmission operation of controlling the FAX communication unit 30 to perform FAX transmission (S1108). Thereafter, the CPU 81 terminates the execution process shown in FIG. 4 and returns to the flow of the function permission process shown in FIGS. 3A and 3B.

When determining that the acquired reception intensity is not more than the second threshold value (S1110: No), if the external terminal device 2 is sufficiently close to the MFP 1 (i.e., the external terminal device 2 is within the area A), the CPU 81 controls the display 50 to display a message "Please press the start button" (S1111).

The CPU 81 determines whether an operation of pressing the start button in response to the message "Please press the start button" displayed on the display 50 has been accepted via the operation buttons 60 (S1112).

When determining that an operation of pressing the start button has been accepted (S1112: Yes), the CPU 81 executes the FAX transmission operation of controlling the FAX communication unit 30 to perform FAX transmission (S1108). Thereafter, the CPU 81 terminates the execution process shown in FIG. 4 and returns to the flow of the function permission process shown in FIGS. 3A and 3B.

When determining that an operation of pressing the start button has not been accepted (S1112: No), the CPU 81 repeatedly performs the aforementioned operations in S1109 to S1112 until the reception intensity becomes more than the second threshold value (S1110: Yes) or until an operation of pressing the start button is accepted (S1112: Yes). At this time, when the message "Please press the start button" is already displayed on the display 50, the CPU 81 skips the step S1111.

<Threshold Setting Process>

Figure 5:
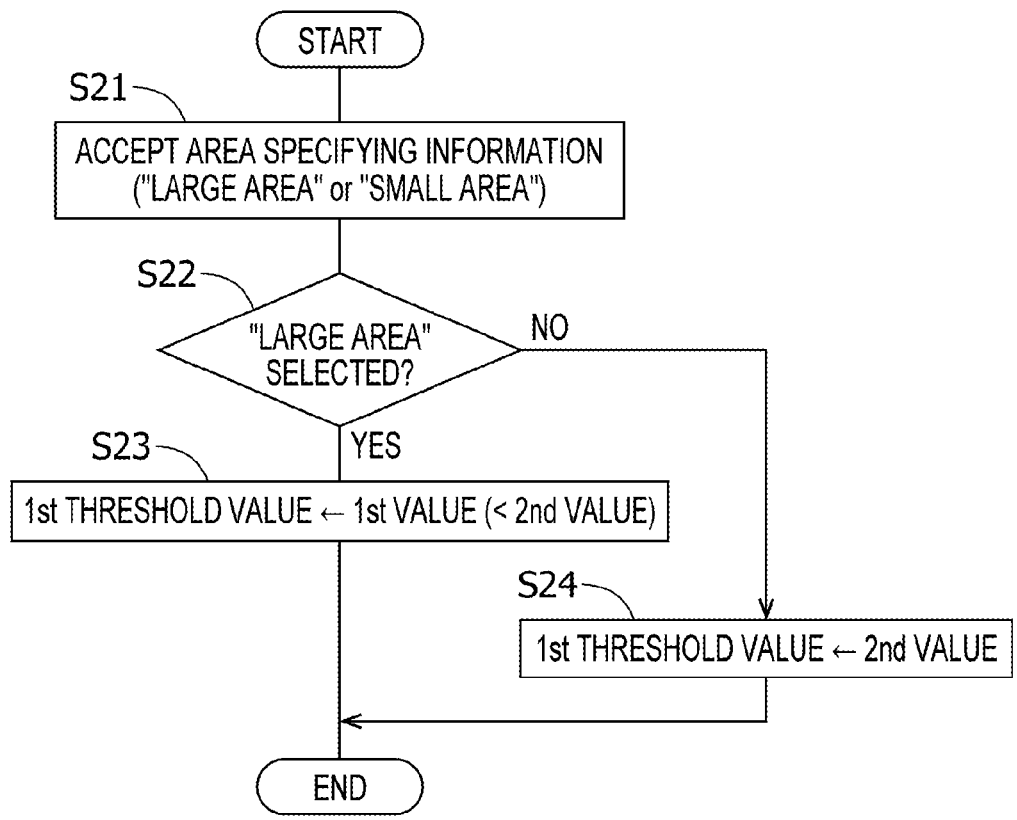
FIG. 5 is a flowchart showing a procedure of a threshold setting process to be executed by the MFP in the illustrative embodiment according to one or more aspects of the present disclosure.

While the MFP 1 is powered on, the CPU 81 of the ASIC 80 repeatedly performs a threshold setting process shown in FIG. 5.

In the threshold setting process, the CPU 81 accepts area specifying information via the operation buttons 60 (S21). The area specifying information specifies an area size of the predetermined area A. The area specifying information is input by a user operation of the operation buttons 60. The predetermined area A is such an area that the MFP 1 is allowed to execute an image processing operation responsive to a function execution instruction from an external terminal device 2 within the area A. For instance, one of "Large Area" and "Small Area" may be selected as the area specifying information.

The CPU 81 determines whether "Large Area" has been selected as the area specifying information (S22).

When determining that "Large Area" has been selected as the area specifying information (S22: Yes), the CPU 81 sets the first threshold value to a first value (S23). Thereafter, the CPU 81 terminates the threshold setting process. When the first threshold value is set to the first value, the area A is set wider than when the first threshold value is set to a second value higher than the first value.

When determining that "Small Area" has been selected as the area specifying information (S22: No), the CPU 81 sets the first threshold value to the second value (S24). Thereafter, the CPU 81 terminates the threshold setting process. When the first threshold value is set to the second value, the area A is set narrower than when the first threshold value is set to the first value lower than the second value.

<Operations and Advantageous Effects>

As described above, external terminal devices 2 within the predetermined area A and external terminal devices 2 within the area B adjacent to the area A are unconditionally connected with the MFP 1. Therefore, there is no need to perform any troublesome authentication process to establish connections between the MFP 1 and the external terminal devices 2. Further, in the illustrative embodiment, when the reception intensity of the wireless signal received from an external terminal device 2 is not more than the first threshold value, it is determined that the external terminal device 2 is farther away from the MFP 1, i.e., the external terminal device 2 is within the area B adjacent to the area A. In this case, wireless signal communication between the MFP 1 and the external terminal device 2 is permitted. Nonetheless, the MFP 1 is not allowed to execute image processing operations by the image forming unit 10 or the FAX communication unit 30. In addition, the MFP 1 transmits to the external terminal device 2 an instruction to cause the external terminal device 2 to display the warning (e.g., information that prompts the user to move the external terminal device 2 closer to the MFP 1).

When the reception intensity of the wireless signal received from the external terminal device 2 exceeds the first threshold value in response to the external terminal device 2 being moved closer to the MFP 1, the MFP 1 is allowed to execute an image processing operation by the image forming unit 10 or the FAX communication unit 30 in accordance with a function execution instruction received from the external terminal device 2.

Consequently, the external terminal devices 2 within the predetermined area A and the external terminal devices 2 within the area B adjacent to the area A are unconditionally connected with the MFP 1. Therefore, there is no need to perform any troublesome authentication process to establish connections between the MFP 1 and the external terminal devices 2. Further, the MFP 1 is allowed to execute image processing operations only in response to function execution instructions from the external terminal devices 2 within the area A.

The MFP 1 includes the display 50 and the operation buttons 60. While determining that the reception intensity of the wireless signal received from the external terminal device 2 is not more than the first threshold value, the ASIC 80 controls the display 50 to display information that prompts the user to press the start button of the operation buttons 60. Additionally, while the information is displayed on the display 50, the ASIC 80 detects whether the start button of the operation buttons 60 has been pressed. Further, when detecting that the start button of the operation buttons 60 has been pressed while the information is displayed on the display 50, the ASIC 80 makes it possible for the MFP 1 to execute the execution instruction of the printing operation or the FAX transmission operation.

The ASIC 80 determines whether the external terminal device 2 is positioned close to or farther from the MFP 1, that is, whether or not the external terminal device 2 is within the predetermined area A, based on the determination as to whether or not the reception intensity of the wireless signal received from the external terminal device 2 is more than the first threshold value. However, even though the external terminal device 2 is positioned close to the MFP 1, the reception intensity of the wireless signal received from the external terminal device 2 might be less than the first threshold value due to obstacles. Hence, when the reception intensity of the wireless signal received from the external terminal device 2 is not more than the first threshold value, the ASIC 80 controls the display 50 to display the information that prompts the user to press the start button of the operation buttons 60. Then, when detecting that the start button has been pressed, the ASIC 80 causes the MFP 1 to execute the printing operation or the FAX transmission operation. Consequently, when the start button of the operation buttons 60 has been pressed, it is assured that the user of the external terminal device 2 is close to the MFP 1. Therefore, even though the reception intensity of the wireless signal received from the external terminal device 2 is less than the first threshold value due to obstacles, the MFP 1 is allowed to execute the printing operation or the FAX transmission operation in response to receipt of the execution instruction of the printing operation or the FAX transmission operation from the external terminal device close to the MFP 1.

The ASIC 80 terminates the wireless signal communication with the external terminal device 2 in the following case. The case is when the ASIC 80 determines that the reception intensity of the wireless signal received from the external terminal device 2 does not exceed the first threshold value and that the start button of the operation buttons 60 has not been pressed, even after a lapse of the particular period of time since the information that prompts the user to press the start button started being displayed, while the information is displayed on the display 50.

When the reception intensity of the wireless signal received from the external terminal device 2 does not exceed the first threshold value, and the start button of the operation buttons 60 has not been pressed, even after a lapse of the particular period of time since the information that prompts the user to press the start button started being displayed, the external terminal device 2 is highly likely to be in the area B adjacent to the area A. Accordingly, in this case, the wireless signal communication between the external terminal device 2 and the MFP 1 should be terminated.

The MFP 1 includes the NFC unit 70 configured to perform near-field wireless communication. When successfully establishing near-field wireless communication with the external terminal device 2 via the NFC unit 70, the ASIC 80 establishes a wireless communication connection with the external terminal device 2. Thereafter, the ASIC 80 makes it possible for the MFP 1 to execute the execution instruction of the printing operation or the FAX transmission operation.

When the near-field wireless communication with the external terminal device 2 is successfully established, it is ensured that the external terminal device 2 is close to the MFP 1. Therefore, in this case, the ASIC 80 may, after permitting data communication between the MFP 1 and the external terminal device 2, make it possible for the MFP 1 to execute the execution instruction of the printing operation or the FAX transmission operation.

The ASIC 80 accepts an entry of the area specifying information via the operation buttons 60, and changes the first threshold value to a value corresponding to the accepted area specifying information.

When the area specified by the area specifying information (e.g., "Large Area" or "Small Area") input via the operation buttons 60 is large, the first threshold value is changed higher. Thereby, the user is allowed to appropriately specify the area where the external terminal device 2 should be so as for the MFP 1 to execute the printing operation or the FAX transmission operation in response to the function execution instruction from the external terminal device 2.

The MFP 1 includes at least the image forming unit 10 and the FAX communication unit 30 as image processing units. The ASIC 80 executes the FAX transmission operation when the function execution instruction received from the external terminal device 2 is the FAX transmission instruction, and the reception intensity of the wireless signal exceeds the second threshold value higher than the first threshold value. Further, the ASIC 80 executes the printing operation when the function execution instruction received from the external terminal device 2 is the print instruction.

When FAX transmission is unconditionally performed in response to an instruction from an external terminal device 2 via wireless signal communication, it might cause a security problem. In consideration of this problem, according to the illustrative embodiment, in a situation where FAX transmission is performed in response to an instruction from an external terminal device 2, the FAX transmission function is executable when the reception intensity of the wireless signal received from the external terminal device 2 exceeds the second threshold value higher than the first threshold value. Thereby, the MFP 1 is allowed to perform only FAX transmission based on an instruction from an external terminal device 2 closer to the MFP 1. Thus, it is possible to ensure a higher level of security.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

In the aforementioned illustrative embodiment, when a connection between an external terminal device 2 and the NFC unit 70 is successfully established, a print request from the external terminal device 2 is accepted regardless of the reception intensity of the wireless signal from the external terminal device 2. Nonetheless, when a connection between an external terminal device 2 and an interface other than the NFC unit 70 is successfully established, a print request from the external terminal device 2 may be accepted regardless of the reception intensity of the wireless signal from the external terminal device 2. For instance, the MFP 1 may further include an acoustic signal receiver configured to receive acoustic signals. In this case, when the MFP 1 successfully receives acoustic signals such as audio watermarking from an external terminal device 2 via the acoustic signal receiver, a print request from the external terminal device 2 may be accepted. Additionally, the MFP 1 may further include a USB (which is an abbreviated form of "Universal Serial Bus") interface. In this case, when the MFP 1 successfully establishes communication with an external terminal device 2 via the USB interface, a print request from the external terminal device 2 may be accepted.

In the aforementioned illustrative embodiment, when the reception intensity of the wireless signal from a connected external terminal device 2 is equal to or less than a threshold value (e.g., the second threshold value), a request for FAX transmission from the external terminal device 2 is accepted in response to the start button being pressed. Nonetheless, in the same situation, the request for FAX transmission from the external terminal device 2 may be accepted in response to one or more buttons other than the start button being pressed. For instance, in the same situation, the display 50 may display thereon numerals in a random order. Further, the request for FAX transmission from the external terminal device 2 may be accepted in response to the numerals being input in the displayed order via the numeric keypad.

In the aforementioned illustrative embodiment, the MFP 1 is exemplified as an image processing apparatus. Further, the print function and the FAX transmission function are exemplified as the image processing functions of the MFP 1. Nonetheless, instead of the print function and the FAX transmission function, other image processing functions such as an image reading function and a copy function may be applied to the present disclosure. Further, instead of the MFP 1, an apparatus (e.g., a printer, an image scanner, and a facsimile machine) having a single function may be employed.

Further, the image data to be printed using the print function and the image data to be transmitted using the FAX transmission function may be image data received from the external terminal device 2 or image data stored in a storage device (e.g., a hard disk drive) included in the MFP 1 or another external terminal device connected with the MFP 1 via a network.

What is claimed is:

1. An image processing apparatus comprising:
a wireless communication unit;
an image processing unit; and
a controller configured to:
when the wireless communication unit receives a wireless signal from an external device, begin a connection operation to establish a wireless connection and perform wireless signal communication between the wireless communication unit and the external device;

acquire a reception intensity of the wireless signal received from the external device via the wireless communication unit;

determine whether the acquired reception intensity is more than a first threshold value;

when determining that the acquired reception intensity is more than the first threshold value, control the image processing unit to execute an image processing instruction received from the external device via the wireless communication unit; and when determining that the acquired reception intensity is not more than the first threshold value, transmit a warning display instruction to display a warning on the external device, to the external device via the wireless communication unit, without controlling the image processing unit to execute the image processing instruction.

2. The image processing apparatus according to claim 1, further comprising:

a display; and operable members, wherein the controller is further configured to:

while determining that the acquired reception intensity is not more than the first threshold value, control the display to display prompting information to prompt a user to operate a particular operable member of the operable members;

while the prompting information is displayed on the display, detect whether the particular operable member has been operated; and when detecting that the particular operable member has been operated, control the image processing unit to execute the image processing instruction received from the external device via the wireless communication unit.

3. The image processing apparatus according to claim 2, wherein the controller is further configured to:

when detecting that the particular operable member has not been operated, determine whether a particular period of time has elapsed since the transmission of the warning display instruction; and when determining that the particular period of time has elapsed since the transmission of the warning display instruction, terminate the wireless connection between the wireless communication unit and the external device.

4. The image processing apparatus according to claim 3, further comprising a near-field wireless communication unit, wherein the controller is further configured to:

when a near-filed wireless connection has been successfully established between the near-field wireless communication unit and the external device, establish the wireless connection between the wireless communication unit and the external device, and control the image processing unit to execute the image processing instruction received from the external device via the wireless communication unit.

5. The image processing apparatus according to claim 4, wherein the controller is further configured to:

accept area specifying information via the operable members, the area specifying information specifying an area such that the image processing unit is allowed to execute the image processing instruction received from the external device positioned within the specified area; and change the first threshold value to a value corresponding to the area specified by the accepted area specifying information.

6. The image processing apparatus according to claim 4, wherein the image processing unit comprises:

a first image processing unit configured to execute a first image processing operation; and a second image processing unit configured to execute a second image processing operation, and wherein the controller is further configured to:

when the image processing instruction is an instruction to execute the first image processing operation, control the first image processing unit to execute the first image processing operation; and when the image processing instruction is an instruction to execute the second image processing operation, in response to determining that the reception intensity is more than a second threshold value higher than the first threshold value, control the second image processing unit to execute the second image processing operation.

7. The image processing apparatus according to claim 6, wherein the first image processing unit is an image forming unit configured to execute a printing operation, and wherein the second image processing unit is a facsimile communication unit configured to execute a facsimile transmission operation.

8. A method adapted to be implemented on a processor coupled with an image processing apparatus comprising a wireless communication unit and an image processing unit, the method comprising:

when the wireless communication unit receives a wireless signal from an external device, beginning a connection operation to establish a wireless connection and perform wireless signal communication between the wireless communication unit and the external device;

acquiring a reception intensity of the wireless signal received from the external device via the wireless communication unit;

determining whether the acquired reception intensity is more than a first threshold value;

when determining that the acquired reception intensity is more than the first threshold value, controlling the image processing unit to execute an image processing instruction received from the external device via the wireless communication unit; and when determining that the acquired reception intensity is not more than the first threshold value, transmitting a warning display instruction to display a warning on the external device, to the external device via the wireless communication unit, without controlling the image processing unit to execute the image processing instruction.

9. The method according to claim 8, wherein the image processing apparatus further comprises a display and operable members, and wherein the method further comprises:

while determining that the acquired reception intensity is not more than the first threshold value, controlling the display to display prompting information to prompt a user to operate a particular operable member of the operable members;

while the prompting information is displayed on the display, detecting whether the particular operable member has been operated; and when detecting that the particular operable member has been operated, controlling the image processing unit to execute the image processing instruction received from the external device via the wireless communication unit.

10. The method according to claim 9, further comprising:
when detecting that the particular operable member has not been operated, determining whether a particular period of time has elapsed since the transmission of the warning display instruction; and
when determining that the particular period of time has elapsed since the transmission of the warning display instruction, terminating the wireless connection between the wireless communication unit and the external device.

11. The method according to claim 10,
wherein the image processing apparatus further comprises a near-field wireless communication unit,
wherein the method further comprises:
when a near-filed wireless connection has been successfully established between the near-field wireless communication unit and the external device,
establishing the wireless connection between the wireless communication unit and the external device, and
controlling the image processing unit to execute the image processing instruction received from the external device via the wireless communication unit.

12. The method according to claim 11, further comprising:
accepting area specifying information via the operable members, the area specifying information specifying an area such that the image processing unit is allowed to execute the image processing instruction received from the external device positioned within the specified area; and
changing the first threshold value to a value corresponding to the area specified by the accepted area specifying information.

13. The method according to claim 11,
wherein the image processing unit comprises:
a first image processing unit configured to execute a first image processing operation; and
a second image processing unit configured to execute a second image processing operation, and
wherein the method further comprises:
when the image processing instruction is an instruction to execute the first image processing operation, controlling the first image processing unit to execute the first image processing operation; and
when the image processing instruction is an instruction to execute the second image processing operation, in response to determining that the reception intensity is more than a second threshold value higher than the first threshold value, controlling the second image processing unit to execute the second image processing operation.

14. The method according to claim 13,
wherein the first image processing unit is an image forming unit configured to execute a printing operation, and
wherein the second image processing unit is a facsimile communication unit configured to execute a facsimile transmission operation.

* * * * *